United States Patent [19]

Tanabe et al.

[11] Patent Number: 5,264,030

[45] Date of Patent: Nov. 23, 1993

[54] FILLER FOR DEGRADABLE PLASTICS AND PROCESS FOR PRODUCING THE SAME

[75] Inventors: Katsuyuki Tanabe, Tokyo; Masaharu Umebayashi, Mitaka; Atsushi Ugomori, Mitaka; Seiji Asaba, Mitaka, all of Japan

[73] Assignee: Nittetsu Mining Co., Ltd., Tokyo, Japan

[21] Appl. No.: 863,931

[22] Filed: Apr. 6, 1992

[30] Foreign Application Priority Data

Apr. 16, 1991 [JP] Japan .................................. 3-084181

[51] Int. Cl.$^5$ ............................................ C08K 13/06
[52] U.S. Cl. ..................... 106/401; 106/400; 106/413; 106/416; 106/417; 106/437; 106/447; 106/456; 106/460; 106/463; 106/465; 106/467; 106/469; 106/471; 524/297
[58] Field of Search ............... 106/463, 464, 465, 471, 106/467, 413, 416, 417, 437, 447, 456, 460, 469, 400, 401; 524/297

[56] References Cited

FOREIGN PATENT DOCUMENTS

| | | |
|---|---|---|
| 2-504037 | 11/1990 | Japan . |
| 3-143901 | 6/1991 | Japan . |
| 3-174449 | 7/1991 | Japan . |
| 3-179036 | 8/1991 | Japan . |
| 3-192116 | 8/1991 | Japan . |
| 3-199245 | 8/1991 | Japan . |
| 3-241050 | 10/1991 | Japan . |
| 3-249208 | 11/1991 | Japan . |

OTHER PUBLICATIONS

Junichi Hakozaki et al., Latest Trend of Degradable Polyethylene, Japan Plastics, vol. 40, No. 9, undated.
Masashi Nishiyama, Biodegradable Plastics for Environmental Protection, Chemicals & Industrials, vol. 43, No. 11 (1990) pp. 85-87.
Tetsu Shinozaki, Trend of Ultramodern Research of Biodegradable Plastics, Nikkei New Materials, Mar. 26, 1990, pp. 33-52.
Yuji Tokumasu et al., Challenge to Development of Biodegradable Plastics, MOL (Chemical & Technological Journal), Feb. 1991, pp. 22-56.
G. M. Harlan et al., Degradable Ethylene-Carbon Monoxide Copolymer, Proceedings of Synposium on Degradable Plastics, Jun. 10, 1987, pp. 14-18.
R. J. Statz et al., Photodegradable Polyethylene, Proceedings of Symposium on Degradable Plastics, Jun. 10, 1987, pp. 51-55.
A. L. Andrady, Weathering of Polyethylene (LDPE) and Enhanced Photodegradable Polyethylene in the Marine Environment, Journal of Applied Polymer Science, vol. 39, pp. 363-370 (1990).
Junichi Hakozaki et al., Research and Trend of Development for Biodegradable Plastics, Plastic Age, Feb., 1990, pp. 158-177.
Tadayoshi Yamanaka et al., New Materials for Environmental Protection, Industrial Materials, vol. 38, No. 1 (Jan. 1990), pp. 17-59.
Jun Hosokawa et al., Materials and Interfaces, Ind. Eng. Chem. Res. vol. 29, No. 5, 1990, pp. 800-805.
W. J. Maddever et al., Additives (Modified Starch-Based Biodegradable Plastics), Plastics Engineering, Jul., 1989, pp. 31-34.
R. V. Wilder, Degradable Plastics Overwhelming U.S.A., Nikkei New Materials, Oct. 9, 1989, pp. 22-33.

*Primary Examiner*—Mark L. Bell
*Assistant Examiner*—Scott L. Hertzog
*Attorney, Agent, or Firm*—Jordan and Hamburg

[57] ABSTRACT

In order to provide a filler for degradable plastics which can simplify the stages for producing a degradable plastic, give effective plastic-degradability, and stabilize the quality of the plastic article, the filler is used as a carrier substance and effective biodegradable and/or photodegradable components are adsorbed on the surfaces of the filler particles via a surface treating agent.

16 Claims, No Drawings

FILLER FOR DEGRADABLE PLASTICS AND PROCESS FOR PRODUCING THE SAME

BACKGROUND OF THE INVENTION

1. Field of the Invention

The present invention relates to a filler applicable to degradable plastics considered to be available for the purpose of global environmental protection and a process for producing the same. More specifically, the filler is produced by using a filler, such as an extender pigment, e.g., calcium carbonate, and clay; an inorganic or organic pigment, e.g., titanium oxide, iron oxide, and phthalocyanine green, as a carrier material, adsorbing effective biodegradable and/or photodegradable component(s), such as starch, benzophenone, anthraquinone, transition metal salts, and oxidization accelerators, on the particle surface of the filler, as a uniform coating, via a surface treating agent, such as, a silane coupling agent, a fatty acid, a resin acid, or a salt thereof, after which the surface-treated filler is kneaded and filled in the plastics thereby uniformly dispersing the plastic-degradable effective component(s) in the plastics so as to be effectively put into practice.

2. Description of the Prior Art

Various environmental conditions on the earth are not permanent conditions imparted by humans, but are balanced in a closed ecological systems, "the earth", constructed and maintained as the result of life activities taking place over several billions of years since the beginning of life. For this reason, there never has been an inexhaustible capacity which admits all kinds of human activity which ignore the cartulary system. Consequently, essentially unlike naturally originating products such as wood and paper, having a cartulary cycle in the natural environment, artificial products, such as plastics, which are not part of the circulatory system in the environment, are impossible to assimilate into the environment after being diffused into the environment. Also, it is very difficult to carry out such activity as artificial treatments and recovery. These are the reasons why plastic degradation measures become a necessary proposition.

Recently, global environmental problems, such as atmospheric and ocean pollution, have been exposed. Measures for treating disposal products of plastics which are yearly produced in an amount of about one hundred million tons have been taken up globally. For these measures, filling up, burning up, recycling the disposal products, and other measures have been put into practice. However, these measures have not yet achieved essential settlement and, thus, for the moment, decrease in volume by the introduction of degradable plastics and apparent disappearance by their spontaneous purification have been attempted. In several countries, the examination has already been made to enforce rules and regulations, such as regulations for using non-degradable plastics and taxation of their use.

Plastics have excellent workabilities, and are suitable for mass production, are light, have high weather and chemical resistances, are easy to be colored, and have good decorative properties, in comparison with metals such as iron. Recently, plastics having improved in terms of physical/mechanical/thermal properties due to so-called engineering plastics have been developed. The total amount of plastic production in Japan has been increasing year by year and has now reached twelve million tons per year. Their application fields are very wide, i.e., they are used in industrial parts, automobiles, electrical household appliances, daily necessities, miscellaneous goods, and many other applications. Plastics are indispensable and useful for our lives as described above, but their non-degradability has been criticized not only as a source of environmental pollution but also as a major cause of global environmental problems. Accordingly, the development of degradable plastics have been strongly needed.

At present, degradable plastics have roughly been classified according to their degradation mechanism into biodegradable and photodegradable plastics. Furthermore, in the biodegradable plastics, degradable plastics in a narrow sense where polymers themselves are degraded by utilizing enzymes or microorganisms and biological breaking down plastics in which starch, etc. are incorporated in plastics and said starch, etc., are degraded to loose the forms of plastics themselves have been known. The term "photodegradable plastics" is intended to means plastics which are degraded by irradiating sun light, ultraviolet, etc. From the technical standpoint, those in which photodegradable groups, such as carbonyl, are introduced and those to which effective components, such as transition metal salts, oxidization accelerators, and photosensitizers, are added to impart photodegradabilities have been known. In any case, the most important problems are that these effective components are uniformly dispersed on the plastics.

In order to impart degradability to the plastics, in many cases, effective components are added in amounts ranging from 0.001 to 80 or 90 parts by weight based on the resin in spite of their degradation mechanism. Up to now, methods in which these components are kneaded separately from the fillers, such as a method involved in utilizing a master batch containing effective components, are applied as the addition method. However, conventional methods have poor operability, and are disadvantageous in that effective components can be uniformly mixed in products only with difficulty. Of these, since effective components cannot be uniformly mixed, these methods have serious problems that the effective components cannot be put into practice effectively, which leads to deteriorate quality such as deterioration in strength.

SUMMARY OF THE INVENTION

In light of the above-enumerated problems, the present invention has been made, the object of which is to simplify the production stages of degradable plastics and, at the same time, to stabilize the quality of plastic products. Thereby, the present invention proposes a technique notably important in measure for treating plastics which has brought on problems from the global environmental viewpoint. That is, according to the present invention, since a filler for degradable plastics with effective component(s) having plastic-degradabilities adsorbed on the surfaces of filler particles to uniformly disperse the filler on them are provided, the stages for producing degradable plastics can be simplified. What is more, since the effective component(s) can be uniformly dispersed, their plastic-degradabilities can be exhibited effectively, and the quality of the products are stabilized, making it possible to use smaller amounts of the effective component(s).

In order to attain the above-described object, the present filler for degradable plastics is comprised of a filler used for plastics and having biodegradable and/or photodegradable effective component(s) adsorbed on the particles of the filler via a surface treating agent. The significance of its construction and actions will clearly be understood by the following explanation.

That is, when an extender/color pigment, e.g., calcium carbonate, clay, talc, mica, titanium oxide, iron oxide, phthalocyanine green, ethylene tetrafluoride, carbon black, etc., is filled, an organic or inorganic surface treating agent, used for the purpose of improving the dispersibilities of the filler and the affinities between the degradable plastics and the filler, and plastic-degradable effective component(s), in order to uniformly disperse the components over the entire surfaces of the filler particles having extended surface areas, are added to the filler to produce a filler for degradable plastics. The present filler is then filled in the plastics, thereby making it possible to uniformly disperse the effective components which impart degradability to the plastic products. The details will be explained hereinbelow.

The filler to be used may be inorganic or organic, and are not specifically restricted. However, that in which the filler itself can easily be degraded in a normal environment is more preferable. For example, carbonate represented by calcium carbonate and magnesium carbonate; and hydroxide represented by aluminum hydroxide and magnesium hydroxide are easily degraded spontaneously in a normal environment, particularly an acidic environment, so they are the optimum fillers to be used for producing degradable plastics.

The kind of plastic degradable effective component is not specifically restricted but includes starch, powder of leather and vegetable fiber such as pulp which are used in the biodegradable plastics; ketone, such as benzophenone, and acetophenone, quinone, such as anthraquinone, transition metal salts such as cobalt naphthanate, oxidation accelerators, photosensitizers, which are added to photodegradable plastics; and the like. These effective components are utilized individually or in combination of two or more thereof. Usually, in order to enhance the affinity with plastics and to improve the dispersibility of the fillers, various surfactants inclusive of a silane coupling agent, a metal soap, a fatty acid or a resin acid are used to carry out surface treatment in either a dry or a wet process. Utilizing this stage, the above-described effective components which promote the decomposition of the plastics are added.

Concerning the amount of the component added, 10 to 200% by weight, preferably 30% by weight or more in order to obtain a sufficient effect, are added for starch, 0.1 to 10% by weight, usually 0.5 to 5% by weight for ketone such as benzophenone or quinone such as anthraquinone, or 0.01 to 40% by weight, usually 0.1 to 20% by weight for transition metal salts, oxidation accelerators, photosensitizers and so on. In the technique where these plastic degradable effective components are mixed in the surface treating agent in advance, and the surface treating agent containing the effective components are added to the filler or a suspension thereof at the stage of the surface treatment (1), or the surface treatment agent and the effective components may be added simultaneously (2), or the effective components are added before or after the surface treatment stage (3), for example, in the case of starch, the fillers and the starch are respectively coated with the same treating agent, whereby both of them are meaningfully mixed with each other. With respect to the effective components which are added in a relatively smaller amount, these effective components and the surface treating agent are uniformly adsorbed and dispersed on the surfaces of the filler particles. That is, in the present invention, since the plastic-degradable effective components are mixed with the filler during, before or after the surface treatment which has been carried out conventionally, the plastic-degradable effective components are uniformly adsorbed on the surfaces of the filler particles. Thereafter, the surface-treated filler is kneaded and filled in the plastics. This makes it possible to effectively utilize the plastic degradable effective components. Furthermore, as an additional method which can be anticipated to obtain a similar effect, a method in which the plastic degradable effective components are kneaded in plasticizers such as dioctylphthalate (DOP) can be considered.

In the filler for degradable plastics produced by the method of the present invention, the effective component which degrades plastics is uniformly adsorbed on the surface of the filler particles. When the fillers are used in the production of articles, degradability can be imparted to the plastics without requiring any special stage and, what is more, the effective component can be uniformly dispersed in the articles without unevenness. Consequently, the filler of the present invention possesses remarkable merits such as savings due to decreased amount of effective component added, which cannot be obtained by the conventional methods. Above all, calcium carbonate, which is relatively inexpensive and possesses an ability to neutralize acid, is also effective as a measure against acid rain and acidic soil.

DETAILED DESCRIPTION OF PREFERRED EMBODIMENTS

Examples 1-22 describe the present invention. Comparative Examples 1-6 are examples of the prior art. Referential Examples 1-5 illustrate the degradation of specimens of the present invention as compared to specimens of the prior art.

EXAMPLE 1

To 20 kg of a wet synthesized slurry of colloidal calcium carbonate with a specific surface area of 20 $m^2/g$ having a solid concentration of 8% by weight was added 1 kg of corn starch, and the mixture was thoroughly stirred and mixed. The slurry comprised of the colloidal calcium carbonate and corn starch was surface-treated by adding 600 g of a solution of 10% strength sodium salt of fatty acid, and it was dried and pulverized to produce a filler for degradable plastics.

EXAMPLE 2

To 20 kg of a wet synthesized slurry of colloidal calcium carbonate with a specific surface area of 20 $m^2/g$ having a solid concentration of 8% by weight was added a mixture in which 1 kg of corn starch has been previously added to 600 g of a solution of 10% strength sodium salt of fatty acid, followed by stirring so as to carry out a surface treatment. This was dried and pulverized to produce a filler for degradable plastics.

EXAMPLE 3

To 20 kg of a slurry of phthalocyanine green with a specific surface area of 40 $m^2/g$ having a solid concentration of 10% by weight was added a mixture in which 1 kg of corn starch had been previously added to 500 g of a solution of 10% strength sodium salt of fatty acid, followed by stirring so as to carry out a surface treatment. This was dried and pulverized to produce a filler for degradable plastics.

EXAMPLE 4

Corn starch (0.75 kg) was added to 1.2 kg of ground calcium carbonate with a specific surface area of 10 $m^2/g$, and the mixture was then incorporated in a 10 l volume Henschel mixer to be mixed for 20 minutes. A sodium salt of fatty acid (29 g) was incorporated therein, and the mixture was again mixed in the Henschel mixer for another 10 minutes, to produce a filler for degradable plastics.

EXAMPLE 5

To 1.2 kg of ground calcium carbonate with a specific surface area of 10 $m^2/g$ was added a mixture of 0.75 kg of corn starch and 29 g of sodium salt of fatty acid having been mixed and stirred previously. The mixture was incorporated in a 10 l volume Henschel mixer, and then mixed for 40 minutes, to produce a filler for degradable plastics.

EXAMPLE 6

A solution (1.2 kg) of 10% strength sodium salt of fatty acid was added to 20 kg with a wet synthesized slurry of colloidal calcium carbonate with a specific surface area of 20 $m^2/g$ having a solid concentration of 8% by weight to carry out a surface treatment. It was filtered dried, pulverized, and 1 kg of corn starch was added thereto. The mixture was mixed in a Henschel mixer for 30 minutes, thereby to produce a filler for degradable plastics.

EXAMPLE 7

A sodium salt of fatty acid (54 g) was added to 1.2 kg of ground calcium carbonate with a specific surface area of 10 $m^2/g$, the mixture was then incorporated in a 10 l volume Henschel mixer to be mixed for 10 minutes to carry out surface treatment. Corn starch (0.75 kg) was incorporated therein, and the mixture was again mixed in the Henschel mixer for another 20 minutes, to produce a filler for degradable plastics.

EXAMPLE 8

A 10 l volume Henschel mixer was charged with 0.5 kg of corn starch and 15 g of sodium salt of fatty acid, and the contents were stirred and mixed for 30 minutes. Subsequently, 1.0 kg of talc having a specific surface area of 13 $m^2/g$ was added thereto, and the mixture was again stirred for another 10 minutes, to produce a filler for degradable plastics.

EXAMPLE 9

To 20 kg of a slurry containing aluminum hydroxide with an average particle size of 8 microns having a solid concentration of 10% by weight was added 1 kg of corn starch, and the mixture was stirred and mixed. Furthermore, 100 g of an aqueous 10% solution of a silane coupling agent was added the mixture and thoroughly stirred. The mixture was dried and pulverized, thereby producing a filler for degradable plastics.

EXAMPLE 10

To a mixture of 0.8 kg of ground calcium carbonate with a specific surface area of 10 $m^2/g$ and 0.4 kg of aluminum hydroxide with a specific surface area of 7 $m^2/g$ was added 0.75 g of corn starch, and the mixture was incorporated in a 10 l volume Henschel mixer and mixed for 20 minutes. To this mixture were added 29 g of sodium salt of fatty acid, followed by stirring for 10 minutes in the mixer to carry out surface treatment, thereby producing a filler for degradable plastics.

EXAMPLE 11

To 20 kg of a wet synthesized slurry of colloidal calcium carbonate of a specific surface area of 20 $m^2/g$ having a solid concentration of 8% by weight were continuously added 600 g of a solution of 10% strength sodium salt of fatty acid and 20 g of anthraquinone and 20 g of benzophenone to carry out surface treatment. Drying and pulverizing this gave a filler for degradable plastics.

EXAMPLE 12

To 20 kg of a wet synthesized slurry of colloidal calcium carbonate with a specific surface area of 20 $m^2/g$ having a solid concentration of 8% by weight was added a mixture in which 40 g of anthraquinone had been previously added to 600 g of a solution of 10% strength sodium salt of fatty acid, followed by stirring so as to carry out a surface treatment to calcium carbonate particles. This was dried and pulverized to produce a filler for degradable plastics.

EXAMPLE 13

To 20 kg of a slurry of phthalocyanine green with a specific surface area of 40 $m^2/g$ having a solid concentration of 10% by weight was added a mixture in which 50 g of anthraquinone had been previously added to 0.5 kg of a solution of 10% strength sodium salt of fatty acid, followed by stirring so as to carry out a surface treatment. This was dried and pulverized to produce a filler for degradable plastics.

EXAMPLE 14

A 10 l volume of Henschel mixer was charged with 2.4 kg of ground calcium carbonate with a specific surface area of 10 $m^2/g$, 21 g of sodium salt of fatty acid, 30 g of anthraquinone, and 30 g of benzophenone, followed by mixing them for 10 minutes, to produce a filler for degradable plastics.

EXAMPLE 15

To 20 kg of wet synthesized slurry of colloidal calcium carbonate with a specific surface area of 20 $m^2/g$ having a solid content of 8% by weight were added 600 g of a solution of sodium salt of 10% strength fatty acid, whereby the surface of the colloidal calcium carbonate was treated, followed by drying and grinding. Thereafter, 40 g of anthraquinone were added thereto, and the mixture was mixed in a Henschel mixer for 10 minutes, thereby to obtain a filler for degradable plastics.

EXAMPLE 16

2.4 kg of ground calcium carbonate with a specific surface area of 10 $m^2/g$ and 48 g of sodium salt of fatty acid were incorporated in a 10 l volume Henschel mixer, and mixed for 15 minutes. To the ground calcium carbonate whose surface had been thus treated were added 30 g of anthraquinone and 30 g of benzophenone, and the mixture was again mixed in the Henschel mixer for another 10 minutes to produce a filler for degradable plastics.

EXAMPLE 17

To 20 kg of a slurry containing aluminum hydroxide with an average particle size of 8 microns having a solid concentration of 10% by weight were added 100 g of an aqueous 10% solution of a silane coupling agent, and the mixture was thoroughly mixed, followed by drying and pulverizing. The resulting aluminum hydroxide dried powder was incorporated in a 10 l volume Henschel mixer, and 50 g of anthraquinone was added, and the mixture was stirred and mixed for 15 minutes to produce a filler for degradable plastics.

EXAMPLE 18

To 20 kg of wet synthesized slurry of colloidal calcium carbonate with a specific surface area of 20 $m^2/g$ having a solid concentration of 8% by weight was added a mixture in which 1 kg of corn starch and 40 g of anthraquinone were previously stirred into 600 g of a 10% solution of a sodium salt of fatty acid to carry out the surface treatment. Drying and pulverization gave a filler for degradable plastics.

EXAMPLE 19

1.2 kg of ground calcium carbonate with a specific surface area of 10 $m^2/g$ and 0.75 kg of corn starch were incorporated in a 10 l volume Henschel mixer, and stirred and mixed for 20 minutes. To this were added 35 g of a sodium salt of fatty acid and 30 g of anthraquinone, and the mixture was again stirred for 10 minutes to carry out surface treatment, thereby producing a filler for degradable plastics.

EXAMPLE 20

To 20 kg of wet synthesized slurry of colloidal calcium carbonate with a specific surface area of 20 $m^2/g$ having a solid concentration of 8% by weight was added 1 kg of corn starch followed by thoroughly stirring and mixing. To the slurry comprising colloidal calcium carbonate and corn starch was added a mixture in which 40 g of anthraquinone was previously stirred into 600 g of a 10% solution of a sodium salt of fatty acid to carry out the surface treatment. Drying and pulverization gave a filler for degradable plastics.

EXAMPLE 21

1.2 kg of ground calcium carbonate with a specific surface area of 10 $m^2/g$ having 54 g of a sodium salt of fatty acid added thereto was incorporated in a 10 l volume Henschel mixer and mixed for 10 minutes to carry out surface treatment. Subsequently, 0.75 g of corn starch was added thereto, and mixed in the Henschel mixer for 20 minutes, after which 30 g of anthraquinone were added, and the mixture was again stirred and mixed in the Henschel mixer for 10 minutes, to produce a filler for degradable plastics.

EXAMPLE 22

1 kg of corn starch was incorporated in a 10 l volume Henschel mixer, stirred for 30 minutes, after which 20 g of a sodium salt of fatty acid was added, followed by stirring for another 10 minutes. The surface treated corn starch and DOP were thoroughly kneaded in a weight ratio of 3:5 to produce a plasticizer for degradable plastics containing the effective component.

COMPARATIVE EXAMPLE 1

A filler for plastics was produced by adding 600 g of a 10% sodium of a sodium salt of fatty acid for 20 kg of wet synthesized slurry of colloidal calcium carbonate with a specific surface area of 20 $m^2/g$ having a solid concentration of 8% by weight and by stirring them to carry out surface treatment, and pulverizing them.

COMPARATIVE EXAMPLE 2

2.4 kg of ground calcium carbonate with a specific surface area of 10 $m^2/g$ and 24 g of a sodium salt of fatty acid in a 10 l volume Henschel mixer were stirred and mixed for 20 minutes to carry out surface treatment. Drying and pulverization gave a filler for plastics.

COMPARATIVE EXAMPLE 3

Talc with a specific surface area of 13 $m^2/g$ was used as a filler for plastics as it was.

COMPARATIVE EXAMPLE 4 to 20 kg of slurry of aluminum hydroxide with an average particle size of 8 microns was added 100 g of an aqueous 10% solution of a silane coupling agent, followed by thoroughly stirring, drying, and pulverizing to produce an additive for plastics.

COMPARATIVE EXAMPLE 5

To 20 kg of an aqueous corn starch slurry having a solid concentration of 4% were added 300 g of a 10% strength solution of a sodium salt of fatty acid, and the mixture was stirred to carry out the surface treatment of the corn starch. Drying and pulverization gave an additive for degradable plastics.

COMPARATIVE EXAMPLE 6

A master batch was produced by kneading 2.5 parts by weight of anthraquinone with 100 parts by weight of polyethylene resin. This master batch was ready for use for degradable plastics.

REFERENTIAL EXAMPLE 1

100 parts by weight of PVC, 50 parts by weight of DOP, 3 parts by weight of tribasic lead sulfate, 3 parts by weight of Ca-Zn stabilizer, 3 parts by weight of epoxidized soybean oil, and 45 parts by weight of each filler produced in Examples 1-10, 18-21, and Comparative Examples 1-5 were mixed by means of mixing rolls and formed into a 1 mm thick plate. The plate was cut out into seven 10 cm square specimens in each case. These plates were embedded in soil 10 cm beneath the surface of the earth, and they were observed at intervals of 1 month, 3 months, 6 months, 9 months, 12 months, and 15 months. As a result, all the plates in which corn starch had been adsorbed via the surface treating agents in the respective Examples were almost completely degraded after 6 to 12 months, whereas in the plates from Comparative Example 5, though the degradation partially proceeded, the whole of degradation required over 15 months. With regards to the plates from Comparative Examples 1 to 4, no degradation sign was seen at all.

REFERENTIAL EXAMPLE 2

Resin pellets were prepared by kneading 100 parts by weight of polyethylene resin with 10 parts by weight of the fillers produced in Examples 11 to 21, and Comparative Examples 1 to 4, or with 10 parts by weight of the master batch of Comparative Example 6, respectively, and molded into 30 micron thick films by the T-die extrusion. These films were cut into 10 cm×20 cm specimens, and outdoor exposure tests were carried out for these specimens. As a result, the specimens from Examples 11 to 21 were degraded after 9 to 15 months, but in the specimens from Comparative Examples 1 to 4, no degradation signs were seen at all. With regard to the specimen from Comparative Example 6, while degradation was totally observed for 6 months, the specimen was not completely degraded, but portions which retained the shape was observed after 15 months.

REFERENTIAL EXAMPLE 3

100 parts by weight of PVC, 50 parts by weight of DOP, 3 parts by weight of tribase, 3 parts by weight of a Ca-Zn stabilizer, 3 parts by weight of epoxidized soybean oil, and 27.7 parts by weight of each filler produced in Comparative Examples 1–4 or 17.3 parts by weight of the additive produced in Comparative Example 5 were mixed by means of mixing rolls and formed into 1 mm thick plates. The soil embedding tests were conducted for these plate in the same manner as that in Referential Example 1. In each case, the plate was only partially degraded or parts of the pellets remained undegraded after 15 months.

REFERENTIAL EXAMPLE 4

10 parts by weight of fillers produced from Comparative Examples 1 to 4 respectively as well as 10 parts by weight of the masterbatch from Comparative Example 6 were kneaded with 90 parts by weight of polyethylene resin, to prepare pellets. The pellets were further molded into 30 micron thick films by the T-die extrusion. The exposure tests were conducted for these films as in Referential Example 2. As a result, in each case, part of the film remained undegraded after 15 months.

REFERENTIAL EXAMPLE 5

100 parts by weight of PVC, 80 parts by weight of the plasticizer containing the degradable effective component prepared in Example 22, 3 parts by weight of tribase, 3 parts by weight of a Ca-Zn stabilizer, 3 parts by weight of epoxylated soybean oil, and 15 parts by weight of the filler produced in Comparative Example 2 were mixed by means of mixing rolls and formed into a 1 mm thick plate. The soil embedding tests were conducted for the plate in the same manner as Referential Example 1. As a result, it was confirmed that almost the whole body was degraded for 9 months.

The results of Referential Examples 1 to 5 are shown in Table 1 all together.

In the table, the mark "ⓞ" represents "no change", "◯" represents "while opaque, change into yellow, and decrease in strength", "△" represents partial degradation and modification, and "×" represents total degradation and modification.

TABLE 1

| Ref. Ex. | Ex. Comp. Ex. | \multicolumn{6}{c}{Degradation conditions (months)} | | | | | |
|---|---|---|---|---|---|---|---|
| | | 1 | 3 | 6 | 9 | 12 | 15 |
| 1 | Ex. 1 | ◯ | ◯ | △ | △ | × | |
| | Ex. 2 | ◯ | △ | △ | × | | |
| | Ex. 3 | ⓞ | ◯ | ◯ | △ | × | |
| | Ex. 4 | ◯ | ◯ | △ | × | | |
| | Ex. 5 | ◯ | △ | × | | | |
| | Ex. 6 | ◯ | ◯ | △ | △ | × | |
| | Ex. 7 | ◯ | ◯ | △ | × | | |
| | Ex. 8 | ◯ | ◯ | ◯ | △ | × | |

TABLE 1-continued

| Ref. Ex. | Ex. Comp. Ex. | \multicolumn{6}{c}{Degradation conditions (months)} | | | | | |
|---|---|---|---|---|---|---|---|
| | | 1 | 3 | 6 | 9 | 12 | 15 |
| | Ex. 9 | ◯ | ◯ | △ | △ | × | |
| | Ex. 10 | ◯ | ◯ | △ | × | | |
| | Ex. 18 | ◯ | ◯ | △ | × | | |
| | Ex. 19 | ◯ | △ | × | | | |
| | Ex. 20 | ◯ | ◯ | △ | △ | × | |
| | Ex. 21 | ◯ | △ | △ | × | | |
| | Comp. 1 | ⓞ | ⓞ | ⓞ | ⓞ | ⓞ | ⓞ |
| | Comp. 2 | ⓞ | ⓞ | ⓞ | ⓞ | ⓞ | ⓞ |
| | Comp. 3 | ⓞ | ⓞ | ⓞ | ⓞ | ⓞ | ⓞ |
| | Comp. 4 | ⓞ | ⓞ | ⓞ | ⓞ | ⓞ | ⓞ |
| | Comp. 5 | ◯ | △ | △ | △ | △ | × |
| 2 | Ex. 11 | ◯ | ◯ | △ | △ | × | |
| | Ex. 12 | ◯ | ◯ | ◯ | △ | △ | × |
| | Ex. 13 | ⓞ | ◯ | △ | × | | |
| | Ex. 14 | ◯ | ◯ | △ | △ | △ | × |
| | Ex. 15 | ◯ | ◯ | △ | △ | × | |
| | Ex. 16 | ◯ | ◯ | △ | △ | × | |
| | Ex. 17 | ◯ | ◯ | △ | △ | × | |
| | Ex. 18 | ◯ | ◯ | ◯ | △ | △ | × |
| | Ex. 19 | ◯ | ◯ | △ | △ | × | |
| | Ex. 20 | ◯ | ◯ | △ | △ | △ | × |
| | Ex. 21 | ◯ | ◯ | △ | △ | × | |
| | Comp. 1 | ⓞ | ⓞ | ⓞ | ⓞ | ⓞ | ⓞ |
| | Comp. 2 | ⓞ | ⓞ | ⓞ | ⓞ | ⓞ | ⓞ |
| | Comp. 3 | ⓞ | ⓞ | ⓞ | ⓞ | ⓞ | ⓞ |
| | Comp. 4 | ⓞ | ⓞ | ⓞ | ⓞ | ⓞ | ⓞ |
| | Comp. 6 | ◯ | ◯ | △ | △ | △ | △ |
| 3 | Comp. 1 | ◯ | ◯ | △ | △ | △ | △ |
| | Comp. 2 | ◯ | ◯ | △ | △ | △ | △ |
| | Comp. 3 | ◯ | ◯ | ◯ | △ | △ | △ |
| | Comp. 4 | ◯ | ◯ | △ | △ | △ | △ |
| 4 | Comp. 1 | ◯ | ◯ | △ | △ | △ | △ |
| | Comp. 2 | ◯ | ◯ | ◯ | △ | △ | △ |
| | Comp. 3 | ◯ | ◯ | ◯ | △ | △ | △ |
| | Comp. 4 | ◯ | ◯ | △ | △ | △ | △ |
| 5 | Ex. 22 | ◯ | ◯ | △ | × | | |

What is claimed is:

1. A filler for degradable plastics comprising a filler used for plastics as a carrier substance, and biodegradable-and/or photodegradable-effective component(s) having been adsorbed on the surfaces of said filler particles via a surface treating agent.

2. The filler as claimed in claim 1, wherein said filler used for plastics comprises an inorganic substance represented by calcium carbonate, clay, talc, mica, titanium oxide, and iron oxide.

3. The filter as claimed in claim 1, wherein said filler used for plastics comprises an organic substance represented by phthalocyanine green.

4. The filler as claimed in claim 1, wherein said filler used for plastics consists essentially of a carbonate represented by calcium carbonate and basic magnesium carbonate and/or a hydroxide represented by aluminum hydroxide and magnesium hydroxide.

5. The filler as claimed in claim 1, wherein said biodegradable-effective component consists essentially of starch.

6. The filler as claimed in claim 5, wherein the biodegradable-effective component contains in an amount of 10–200% by weight based on the filler.

7. The filler as claimed in claim 1, wherein said photodegradable-effective component is one or more components selected from among ketone, quinone, transition metal salts, oxidation accelerators, and photosensitizers.

8. The filler as claimed in claim 1, which contains both the biodegradable and photodegradable effective components.

9. The filler as claimed in claim 1, wherein said surface treating agent is a surfactant.

10. A process for producing a filler for degradable plastics which comprises adding biodegradable-and/or photodegradable-effective component(s) to a filler before or during the surface treatment of the filler with a surface treating agent thereby adsorbing the component(s) on the surfaces of filler particles.

11. A process for producing a filler for degradable plastics characterized in that the biodegradable-and/or photodegradable-effective components are mixed with and dispersed in a surface treating agent, thereby surface-treating the filler with said surface treating agent and said biodegradable- and/or photodegradable-effective components.

12. A process for producing a filler for degradable plastics characterized in that biodegradable-and/or photodegradable-effective component(s) are added to a filler and adsorbed on the surfaces of the filler particles after the filler is surface-treated.

13. A process for producing a filler for degradable plastics characterized in that an biodegradable-effective component is mixed with and dispersed in a filler, followed by surface-treating.

14. A process for producing a filler for degradable plastics characterized in that an biodegradable-effective component is mixed with and dispersed in a filler, followed by adding a surface treating agent and an photodegradable-effective component.

15. A plasticizer for degradable plastics with biodegradable- and/or photodegradable-effective components mixed and dispersed therein.

16. A process for producing a plasticizer for degradable plastics comprising mixing with and dispersing in a plasticizer a biodegradable- and/or photodegradable-effective component.

* * * * *